US007726213B2

(12) United States Patent
Murelitharan

(10) Patent No.: US 7,726,213 B2

(45) Date of Patent: Jun. 1, 2010

(54) OPTO-MECHANICAL TILT AND INERTIAL FORCE SENSOR

(75) Inventor: A/L Munlandy Murelitharan, Relau (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 162 days.

(21) Appl. No.: 11/433,012

(22) Filed: May 11, 2006

(65) Prior Publication Data

US 2007/0261504 A1 Nov. 15, 2007

(51) Int. Cl.
*G01N 29/00* (2006.01)

(52) U.S. Cl. ........................ 73/865; 73/1.85; 73/514.29

(58) Field of Classification Search .............. 73/514.12, 73/514.26, 514.36, 514.37, 11.01, 836, 865, 73/844, 514.21, 178 R, 495, 514.09, 514.34, 73/1.85, 514.29; 200/61.4; 310/329, 338, 310/978
See application file for complete search history.

(56) References Cited

U.S. PATENT DOCUMENTS 1,639,229 A * 8/1927 Luckey ....................... 356/250
2,124,892 A * 7/1938 Nichols ....................... 33/314
2,772,411 A * 11/1956 Cooper ....................... 340/685
3,073,922 A * 1/1963 Miller ..................... 200/61.48
3,597,090 A * 8/1971 Humphrey .................. 356/149
4,344,062 A * 8/1982 Sudoh et al. .................. 338/35
5,129,725 A * 7/1992 Ishizuka et al. ............. 356/617
5,269,187 A * 12/1993 Hanson ....................... 73/495
5,336,983 A * 8/1994 Watanabe ................... 318/651
5,726,886 A * 3/1998 Yamakado et al. ............ 701/93
5,847,824 A * 12/1998 Ohtomo et al. ............. 356/249
2006/0090577 A1* 5/2006 Bates et al. ................ 73/865.3
2007/0262249 A1* 11/2007 Lee et al. ............... 250/231.13

FOREIGN PATENT DOCUMENTS

EP 00047029 A1 * 2/1992

* cited by examiner

*Primary Examiner*—J M Saint Surin

(57) ABSTRACT

A sensor having a mass that moves relative to a structure is disclosed. The mass is attached to the structure by a rigid member such that the mass moves around a pivot point on the structure, the pivot point remaining fixed with respect to the structure as the mass moves. A code scale is attached to the mass. An imaging system that is fixed with respect to the structure forms an image of the code scale. A controller provides an indication of a position of the mass relative to the structure using the code scale image. The rigid member can include a surface having the code scale thereon, the surface rotating about the pivot point as the mass moves such that the surface remains at a fixed distance from the pivot point as the mass moves.

17 Claims, 6 Drawing Sheets

20
23
22
26
27
28
25
21
CONTROLLER
29
24

OPTO-MECHANICAL TILT AND INERTIAL FORCE SENSOR

BACKGROUND OF THE INVENTION

Inertial force sensors are used in numerous consumer products. For example, various occupant protection systems in automobiles utilize such sensors to trigger actions designed to protect the vehicle occupant when the automobile is involved in a collision or the system senses that a collision is imminent. Such systems are used to actuate air bags in the event of a collision and to pretension seatbelts when sensors indicate that a collision is about to occur. Sensors that provide signals indicative of the tilt angle of one component relative to the earth are also used in a wide range of equipment from components for use in artificial reality systems to surveying equipment and robotics.

These sensors typically utilize a weight and spring arrangement in which a moveable weight is fixed to a stationary component by a spring. When the apparatus is accelerated or decelerated, the weight moves relative to the stationary component. Similarly, in a tilt sensor, the gravitational forces on the weight change with the angle of inclination of the apparatus relative to the Earth. The change in force on the weight causes the weight to move relative to the stationary portion of the apparatus. Such sensors typically include a transducer that converts the position of the weight relative to the fixed component, or the rate of change in that position, into an electrical signal representing the displacement or rate of change of the position, respectively.

The transducers rely on a variety of techniques to convert the motion of the mass into an electrical signal. In the simplest schemes, the mass is mounted on a cantilever that provides the spring function. A contact on the cantilever makes an electrical connection with a contact on the stationary component when the mass moves a predetermined distance. Systems in which the cantilever includes a piezoelectric element that generates a current in response to the bending of the element are also known.

The accuracy with which the force on the mass can be measured depends on the reproducibility of the spring constant and mass from device to device. In addition, the accuracy depends on the sensitivity of the transducer. Low cost sensors are often fabricated using micro-machining techniques. If a simple threshold measurement is all that is required, the reproducibility limitations can be easily met with such techniques. Such sensors are sufficient for use in triggering airbag deployment in an automobile. However, if a more accurate analog measurement is needed, the device may need to be individually calibrated leading to increased cost.

In addition, the amount of motion that must be sensed in these miniature devices requires a transducer that has high sensitivity, particularly if an analog measurement of the displacement is needed. The cost of such transducers can limit the applications in which such analog sensors can be utilized.

In addition, these sensors must often operate in a hostile environment in which the temperature varies over a large range and in which dirt and other contamination can buildup leading to device failure. Hence, the devices must typically be sealed in a manner that keeps out the contamination while still allowing the sensor to function properly.

Finally, these sensors are subject to oscillations resulting from resonances in the spring-mass system. Hence, some means for damping such oscillation is often required. The damping mechanism must not interfere with the transducer mechanism, and hence, there are constraints on the damping mechanism that further increase the cost of the sensor.

SUMMARY OF THE INVENTION

The present invention includes a sensor having a mass that moves relative to a structure. The mass is attached to the structure by a rigid member such that the mass moves around a pivot point on the structure, the pivot point remaining fixed with respect to the structure as the mass moves. A code scale is attached to the mass. An imaging system that is fixed with respect to the structure forms an image of the code scale. A controller provides an indication of a position of the mass relative to the structure using the code scale image. In one aspect of the invention, the rigid member includes a surface having the code scale thereon, the surface rotating about the pivot point as the mass moves such that the surface remains a fixed distance from the pivot point as the mass moves. In another aspect of the invention, the mass is located in a chamber attached to the structure, the chamber includes a liquid through which the mass moves. The chamber can include a transparent window so that the imaging system is located outside the chamber, the imaging system forming the image through the transparent window.

DETAILED DESCRIPTION OF THE PREFERRED EMBODIMENTS OF THE INVENTION

Figure 1:
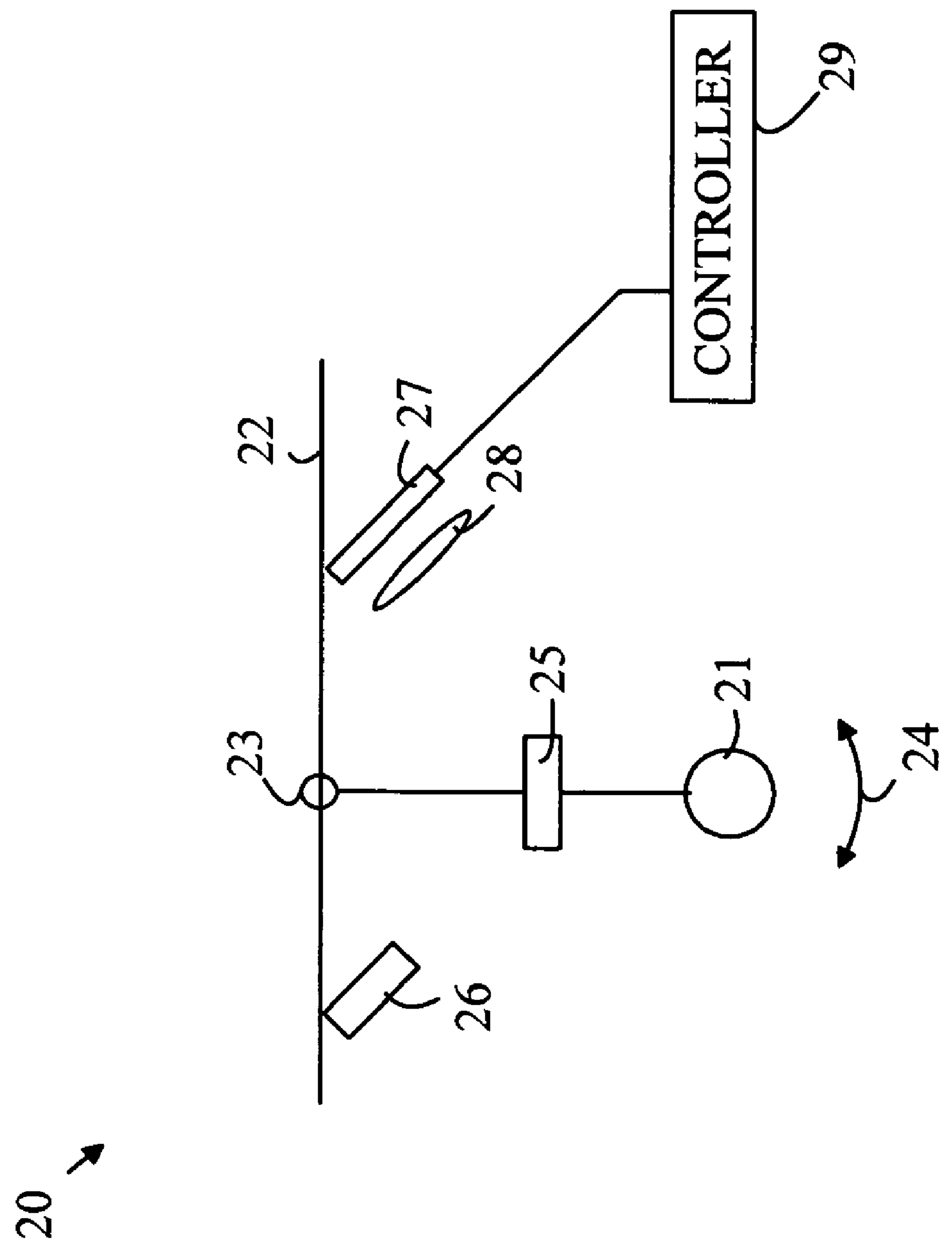
FIG. 1 illustrates one embodiment of a sensor according to the present invention.

The manner in which the present invention provides its advantages can be more easily understood with reference to FIG. 1, which illustrates one embodiment of a sensor according to the present invention. Sensor 20 includes a solid mass 21 that is connected to a support 22 via a pivot point 23 such that mass 21 is free to move relative to support 22 in at least one direction as shown at 24. The position of mass 21 relative to support 22 is determined by a controller 29. Sensor 20 includes a scale 25 that moves with mass 21. The position of this scale relative to support 22 is sensed optically by a camera that includes lens 28 and image sensor 27. Scale 25 is illuminated by a light source 26. Image sensor 27 and lens 28 are fixed relative to surface 22. Hence, as mass 21 moves, the position of the image on scale 25 on the image sensor also moves.

If support 22 is tilted, mass 21 will move relative to support 22 such that the mass minimizes the distance between the mass and the center of the earth. Hence, sensor 20 can be used to provide a tilt measurement. Similarly, if support 22 undergoes an acceleration or deceleration, mass 21 will move relative to support 22 by an amount that depends on the magnitude and direction of the acceleration or deceleration in question.

Scale 25 can include an absolute encoding pattern that specifies the displacement of scale 25 relative to an equilibrium position. Controller 29 causes image sensor 27 to generate images at regular time intervals. In this case, controller

29 compares the image received from image sensor 27 with this known pattern after displacing the known pattern by various amounts. For example, the correlation of the image from sensor 27, after that image has been displaced by each test displacement, with the known pattern, can be computed. The displacement that provides the highest correlation is chosen.

Alternatively, scale 25 can include a random pattern. In this case, successive frames from image sensor 27 are compared after one frame is displaced relative to the other to determine the displacement that occurred between the frames. This mode of operation provides a relative motion indication in a manner similar to that used in determining the motion of an optical mouse over a surface.

The above-described embodiments rely on the imaging of an encoding pattern on scale 25 onto image sensor 27. Hence, the distance between image sensor 27 and scale 25 must remain substantially constant when mass 21 moves to allow an in focus image to be generated on image sensor 27. It should be noted that only the portion of scale 25 that is actually being imaged at any particular time needs to be in focus. This constraint can be accommodated in a number of ways. For example, if the aperture of lens 28 is sufficiently small, the depth of the field of the camera will be sufficient to allow the desired portion of the scale to be in focus over the expected range of motion of mass 21. This solution restricts the amount of light that reaches image sensor 27, and hence, has the disadvantage of requiring a brighter light source.

If the mass is constrained to move in one plane, then the optical axis of the camera can be placed such that the optical axis of the lens is perpendicular to that plane. Hence, if scale 25 has a planar surface that remains parallel to the plane of motion when mass 21 moves, the scale will remain at a fixed distance from image sensor 27, and hence, the portion of the scale image in question will remain in focus.

Figure 2:
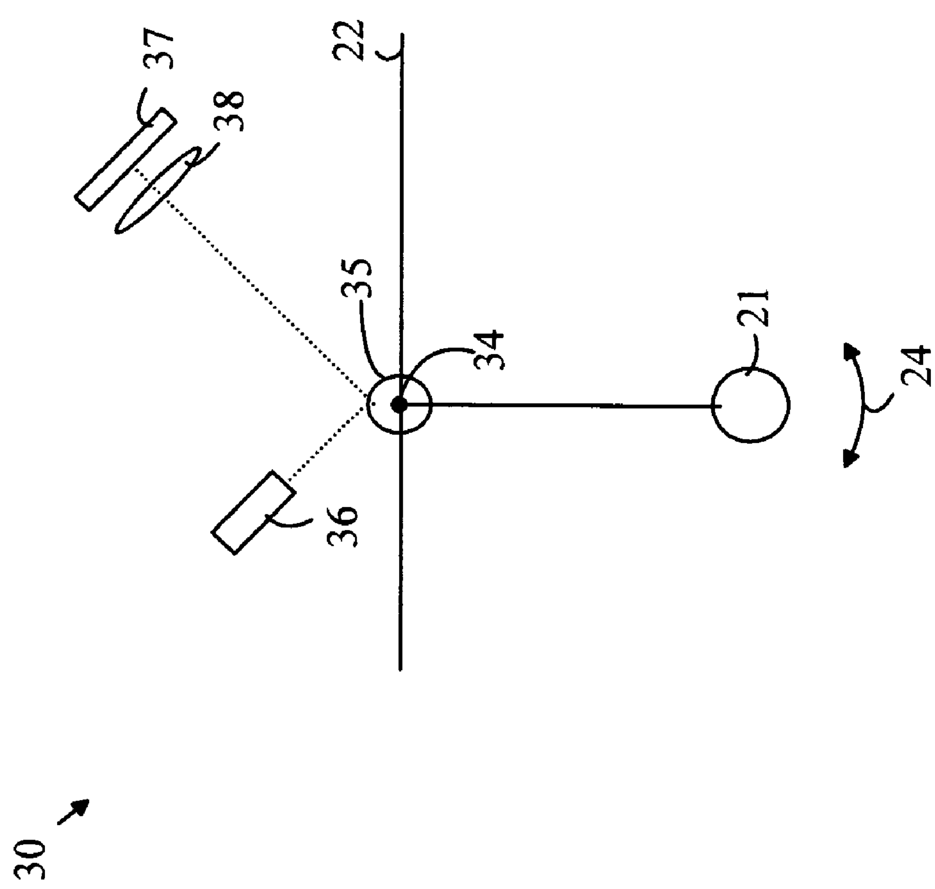
FIG. 2 illustrates another embodiment of a sensor according to the present invention.

Refer now to FIG. 2, which illustrates another embodiment of a sensor according to the present invention. Sensor 30 utilizes a position scale 35 that rotates about pivot point 34 as mass 21 moves around pivot point 34. Scale 35 is located on a surface that maintains a fixed distance from pivot point 34 as it rotates. The surface can be spherical or, in the case of a one-dimensional motion, cylindrical. The center of the sphere or the axis of the cylinder passes through pivot point 34. The top surface of the scale is illuminated by a light source 36, and an image of a portion of the top surface is formed on image sensor 37 with the aid of lens 38. In this arrangement, the portion of the scale that is imaged is always at the same distance from the image sensor, and hence, remains in focus as the scale moves.

Figure 3:
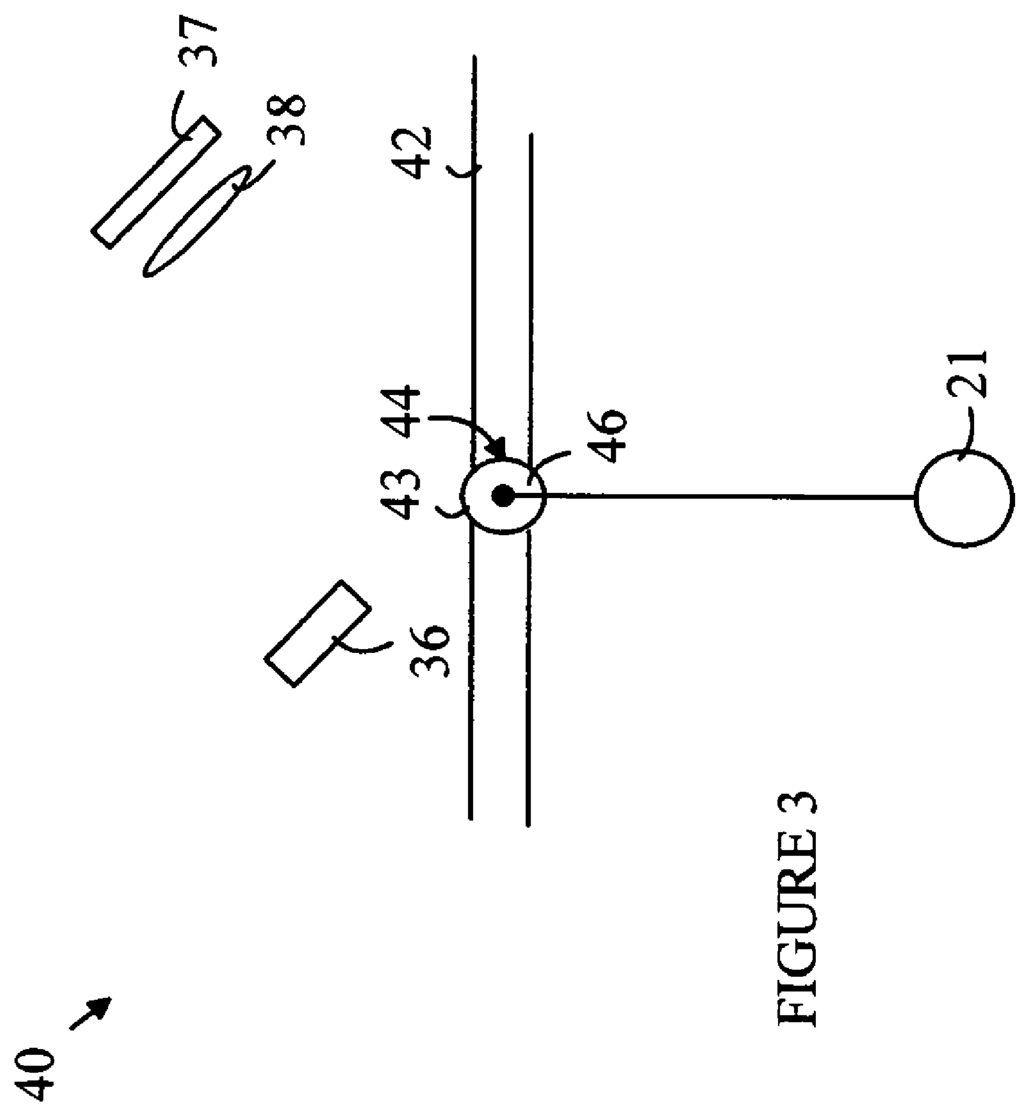
FIG. 3 illustrates a two-dimensional sensor according to one embodiment of the present invention.

Refer now to FIG. 3, which illustrates a two-dimensional sensor according to one embodiment of the present invention. Sensor 40 utilizes a ball joint implemented by trapping a ball 46 in a socket 44 in stationary surface 42. Mass 21 can now move both in the plane of the drawing and in directions into, and out of, the plane of the drawing. The top surface of ball 43 includes the scale that is imaged by image sensor 37. In this embodiment, the scale is a two-dimensional scale that uniquely determines the displacement of mass 21 in both directions of motion.

The embodiments discussed above are equivalent to a mass that is centered by two springs whose spring constants depend on the mass and the gravitational constant. As such, the system has resonant frequencies that can be excited if the mass is caused to move too quickly. Such resonances will interfere with the operation of the sensor, and hence, are to be avoided.

The optical sensing system utilized in the present invention makes it possible to provide damping and protection from the environment.

Figure 4:
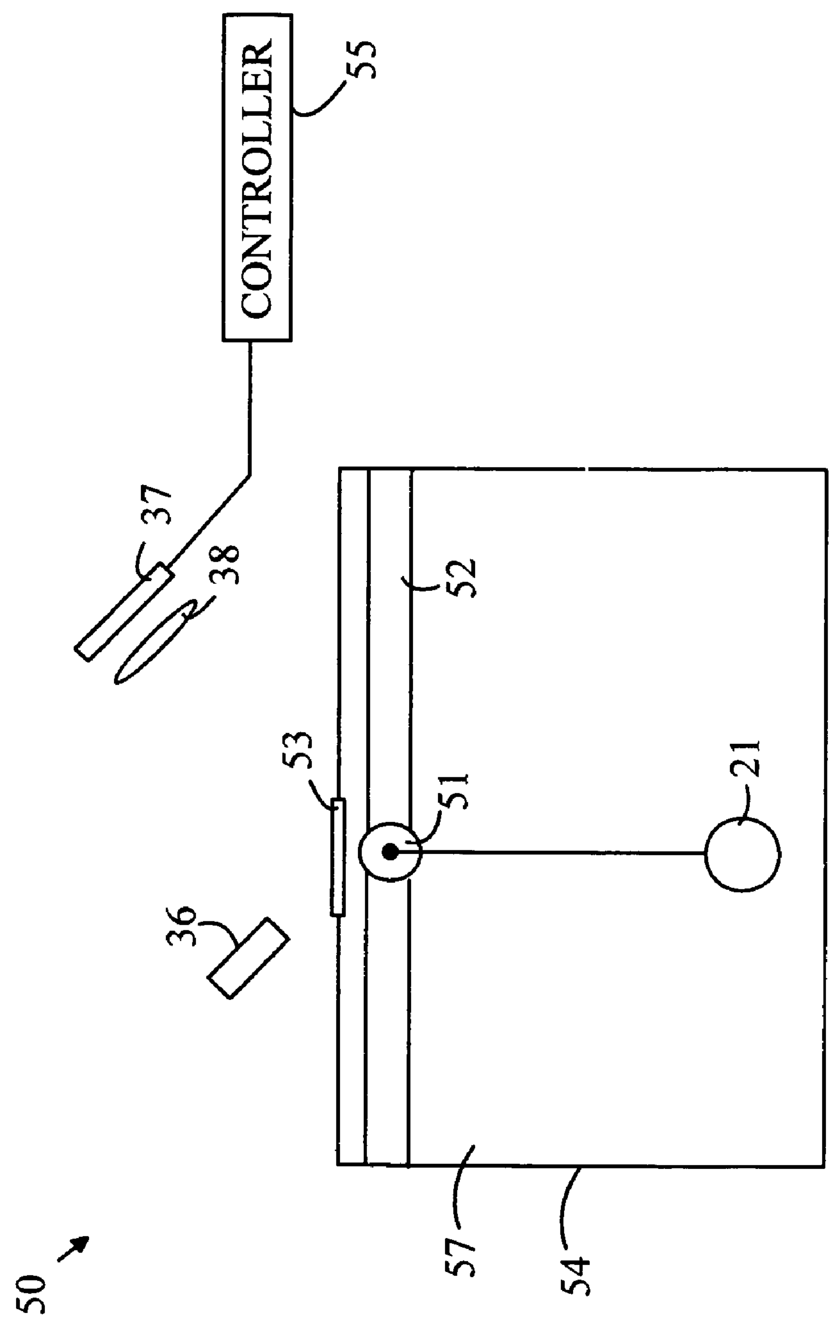
FIG. 4 is a cross-sectional view of another embodiment of a sensor according to the present invention.

Refer now to FIG. 4, which is a cross-sectional view of another embodiment of a sensor according to the present invention. Sensor 50 includes a mass 21 that that is coupled to a ball joint 51 in a stationary member 52. The top surface of ball joint 51 includes a code scale that is imaged on a sensor 37 through a window 53. The code scale is illuminated with a light source 36. Image sensor 37 is connected to controller 55 that determines the displacement of mass 21 by comparing the portion of the scale imaged on image sensor 37 with a predetermined pattern or a previous image. Mass 21 and the ball joint are located within a sealed container 54 that is filled with a viscous liquid 57 that damps oscillations in the movement of mass 21. In addition, the liquid can provide a lubricating function with respect to ball joint 51. The liquid is transparent at the wavelength of light source 36, and hence, does not interfere with position determinations.

Figure 5:
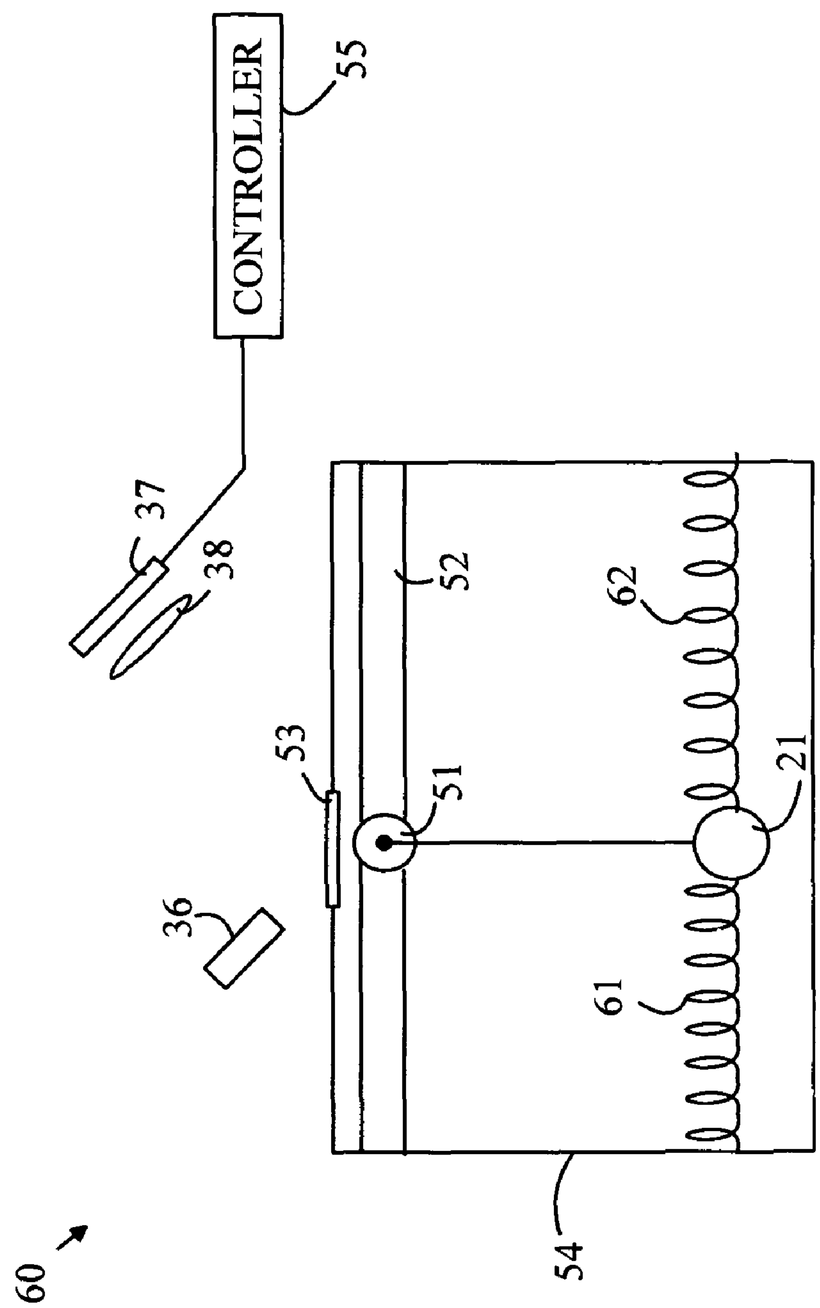
FIG. 5 is a cross-sectional view of another embodiment of a sensor according to the present invention.

The damping function can also be implemented with springs. Refer now to FIG. 5, which is a cross-sectional view of another embodiment of a sensor according to the present invention. Sensor 60 utilizes springs 61 and 62 to alter the resonance frequencies of the mass to values that are not easily excited by the mechanical stimulations that are likely to be encountered by the sensor.

Figure 6:
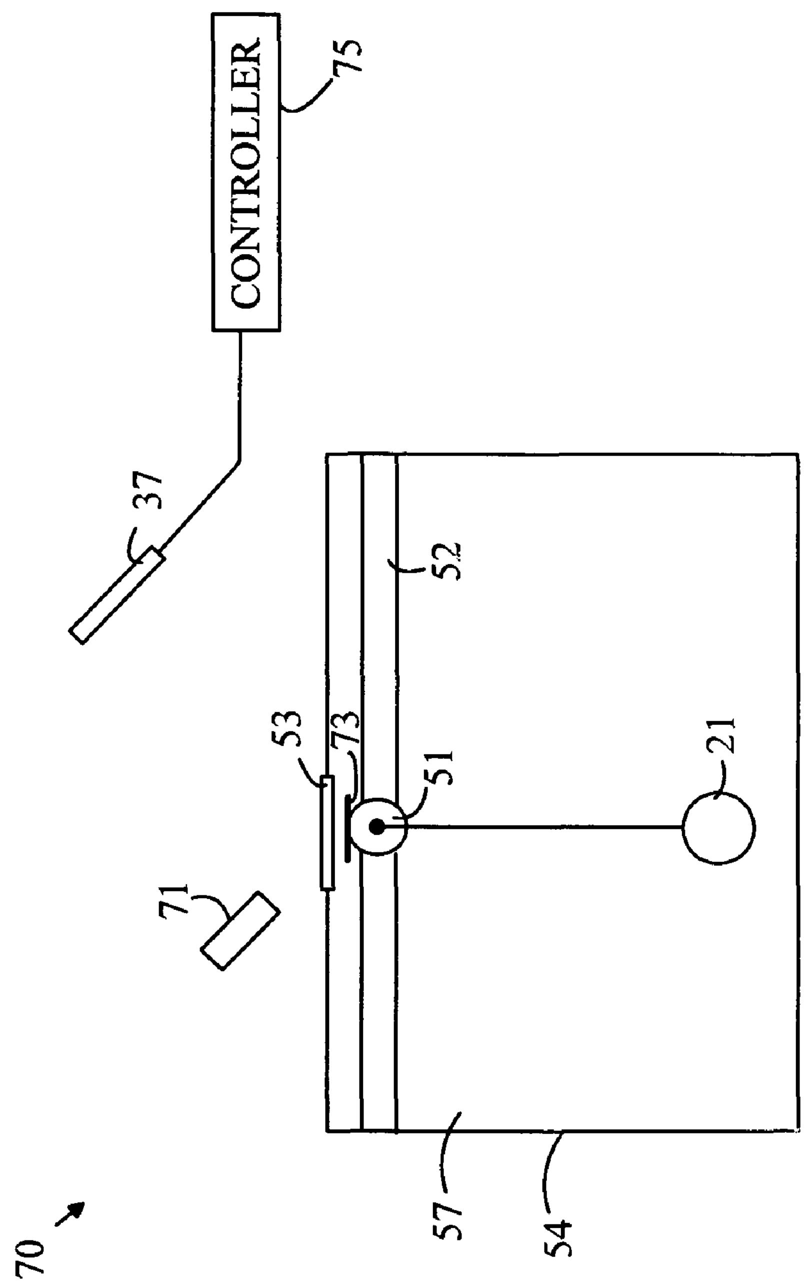
FIG. 6 is a cross-sectional view of another embodiment of a sensor according to the present invention.

The above-described embodiments of the present invention utilize a code scale that moves with the mass and is imaged onto a stationary imaging array such that the position of the mass can be determined. However, other methods for sensing the location of the mass can be utilized. Refer now to FIG. 6, which is a cross-sectional view of another embodiment of a sensor according to the present invention. Sensor 70 utilizes a collimated light source 71 such as a semiconductor laser. The top surface of the ball in ball joint 51 includes a planar mirror 73. Mirror 73 can be affixed to the ball or the mirror surface can be cut into the ball itself. The collimated beam is reflected from mirror 73 and onto imaging sensor 37. The position of the spot of light generated by the collimated beam on imaging sensor 37 is determined by the tilt angles of mirror 73, and hence, can be used by controller 75 to determine the location of mass 21. To simplify the following discussion, the term code scale is defined to include a single reflective element such as mirror 73.

It should be noted that the present invention can make use of the optical assemblies that are utilized in the class of computer pointing devices referred to as "optical mice". An optical mouse typically includes a light source that illuminates a surface over which the mouse moves and an optical system that forms an image of that surface on an imaging array that includes a two-dimensional array of photodiodes. In an optical mouse, successive images are used to determine the direction and magnitude of the movement of the optical mouse with respect to the surface over which it moves. The optical assemblies for such pointing devices are mass-produced, and hence, are relatively inexpensive. In the case of such optical mice, the controller is typically a custom integrated circuit. However, the controller can be constructed from any suitable data processing element including a general purpose computer.

Various modifications to the present invention will become apparent to those skilled in the art from the foregoing description and accompanying drawings. Accordingly, the present invention is to be limited solely by the scope of the following claims.

What is claimed is:

1. A sensor comprising:

a structure;

a mass that moves relative to said structure, said mass is attached to said structure by a rigid member such that said mass moves around a pivot point on said structure, said pivot point remaining fixed with respect to said structure as said mass moves;

a code scale attached to said mass;

an imaging system for forming an image of said code scale, said imaging system being fixed with respect to said structure, said imaging system including an image sensor to generate said image of said code scale and a lens positioned between the image sensor and the code scale to focus said code scale onto the image sensor; and a controller that provides an indication of a position of said mass relative to said structure, said controller utilizing said code scale image, said controller being configured to compare said code scale image with an absolute encoding pattern that specifies a displacement of said code scale relative to an equilibrium position or to compare said code scale image with another code scale image to determine a displacement of said code scale that occurred between said code scale image and said another code scale image.

2. The sensor of claim 1 wherein said indication comprises a determination of an inclination of said structure with respect to the earth.

3. The sensor of claim 1 wherein said imaging system comprises a light source for illuminating said code scale.

4. The sensor of claim 1 wherein said rigid member comprises a surface having said code scale thereon, said surface rotating about said pivot point as said mass moves such that said surface remains at a fixed distance from said pivot point as said mass moves.

5. The sensor of claim 1 wherein said mass is located in a chamber attached to said structure, said chamber comprising a liquid through which said mass moves.

6. The sensor of claim 5 wherein said chamber comprises a transparent window and wherein said imaging system is located outside said chamber, said imaging system forming said image through said transparent window.

7. The sensor of claim 5 wherein said liquid is transparent to light.

8. The sensor of claim 1 further comprising a spring mechanism that applies a restoring force to said mass when said mass moves from an equilibrium position with respect to said structure.

9. The sensor of claim 8 wherein said restoring force is a monotonic function of a distance between said mass and said equilibrium position.

10. A sensor comprising:

a structure;

a mass that moves relative to said structure, said mass is attached to said structure by a rigid member such that said mass moves around a pivot point on said structure, said pivot point remaining fixed with respect to said structure as said mass moves;

a code scale attached to said mass;

a camera to form an image of said code scale, said camera being fixed with respect to said structure, said camera including an image sensor to generate said image of said code scale and a lens positioned between the image sensor and the code scale to focus said code scale onto the image sensor; and a controller that provides an indication of a position of said mass relative to said structure, said controller utilizing said code scale image, said controller being configured to compare said code scale image with an absolute encoding pattern that specifies a displacement of said code scale relative to an equilibrium position or to compare said code scale image with another code scale image to determine a displacement of said code scale that occurred between said code scale image and said another code scale image.

11. The sensor of claim 10 wherein said indication comprises a determination of an inclination of said structure with respect to the earth.

12. The sensor of claim 10 wherein said rigid member comprises a surface having said code scale thereon, said surface rotating about said pivot point as said mass moves such that said surface remains at a fixed distance from said pivot point as said mass moves.

13. The sensor of claim 10 wherein said mass is located in a chamber attached to said structure, said chamber comprising a liquid through which said mass moves.

14. The sensor of claim 13 wherein said chamber comprises a transparent window and wherein said camera is located outside said chamber, said camera forming said image through said transparent window.

15. The sensor of claim 13 wherein said liquid is transparent to light.

16. The sensor of claim 10 further comprising a spring mechanism that applies a restoring force to said mass when said mass moves from an equilibrium position with respect to said structure.

17. The sensor of claim 16 wherein said restoring force is a monotonic function of a distance between said mass and said equilibrium position.

* * * * *